United States Patent [19]

Evans et al.

[11] Patent Number: 5,776,848
[45] Date of Patent: Jul. 7, 1998

[54] MOLYBDENUM EPOXIDATION CATALYST RECOVERY

[75] Inventors: Thomas I. Evans, Glenmoore, Pa.; Robert L. Cannon, Wilmington, Del.

[73] Assignee: Arco Chemical Technology, L.P., Greenville, Del.

[21] Appl. No.: 903,082

[22] Filed: Jul. 30, 1997

[51] Int. Cl.$^6$ .............................. B01Z 38/60; C01G 39/00
[52] U.S. Cl. .................. 502/27; 502/22; 423/58; 423/59
[58] Field of Search ............. 502/22, 27; 423/58, 423/59

[56] References Cited

U.S. PATENT DOCUMENTS

| | | | |
|---|---|---|---|
| 3,567,433 | 3/1971 | Gutnikov | 75/103 |
| 3,763,303 | 10/1973 | Khuri et al. | 423/54 |
| 3,819,663 | 6/1974 | Levine et al. | 260/348.5 |
| 4,405,572 | 9/1983 | Moore et al. | 423/54 |
| 4,455,283 | 6/1984 | Sweed | 423/53 |
| 4,485,074 | 11/1984 | Poenisch | 423/55 |
| 4,547,345 | 10/1985 | Sebenik et al. | 423/53 |
| 5,171,868 | 12/1992 | Albal et al. | 549/529 |
| 5,276,235 | 1/1994 | Dubner | 585/469 |
| 5,585,077 | 12/1996 | Evans et al. | 423/58 |

FOREIGN PATENT DOCUMENTS 458253  7/1949  Canada.

*Primary Examiner*—Glenn Caldarola
*Assistant Examiner*—Alexander G. Ghyka
*Attorney, Agent, or Firm*—Stephen D. Harper; William C. Long

[57] ABSTRACT

An aqueous epoxidation process stream containing molybdenum and sodium values is incinerated and an aqueous solution containing molybdenum and sodium is recovered, acidified and reacted with a calcium compound without first adding base to form solid $CaMoO_4$ which is separated.

3 Claims, 1 Drawing Sheet

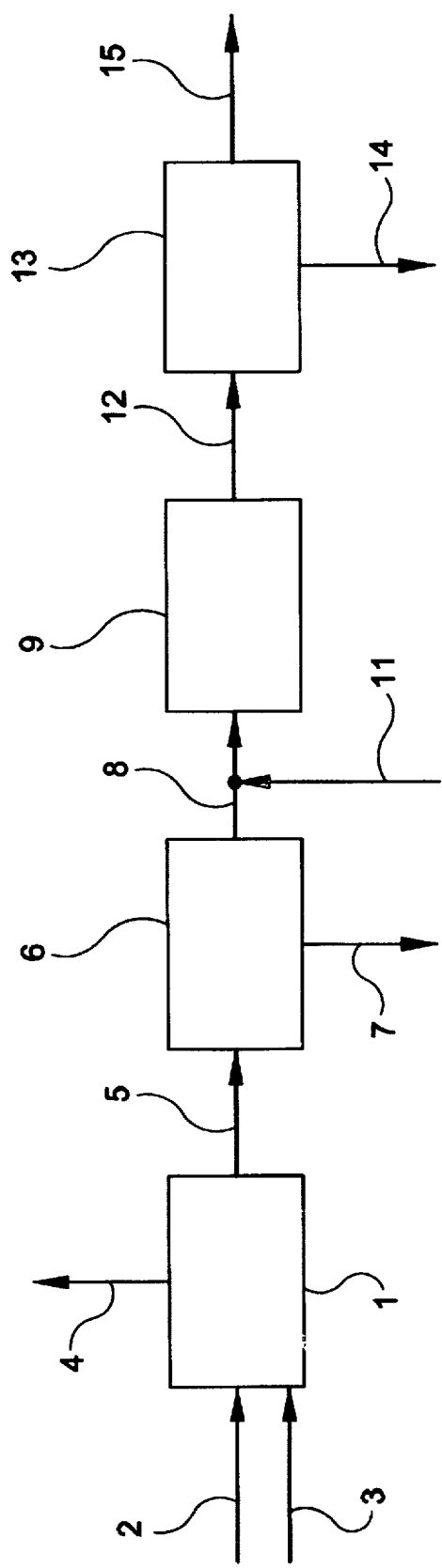

5,776,848

MOLYBDENUM EPOXIDATION CATALYST RECOVERY

BACKGROUND OF THE INVENTION

1. Field of the Invention

The production of oxirane compounds such as propylene oxide by the catalytic reaction of an olefin with an organic hydroperoxide is a process of great commercial importance. Generally a homogeneous molybdenum catalyst is employed. The Oxirane Process for the co-production of propylene oxide and styrene monomer is illustrative of this technology.

The process of the instant invention relates to the recovery of molybdenum epoxidation catalyst values in such epoxidation process technology.

2. Description of Related Art

An extremely successful process for the co-production of propylene oxide and styrene monomer involves the molecular oxygen oxidation of ethyl benzene to form ethyl benzene hydroperoxide, the catalytic reaction of the hydroperoxide with propylene to form propylene oxide and 1-phenyl ethanol, and the dehydration of the 1-phenyl ethanol to styrene monomer. The basic patent describing this process is U.S. Pat. No. 3,351,635.

In practice of the process, the epoxidation reaction mixture, usually after separation of unreacted propylene by distillation, is treated with aqueous caustic in an amount in excess of that necessary both to react with contained molybdenum values to form sodium molybdate and to react with organic impurities such as acids and phenols which are also contained in the epoxidate. See U.S. Pat. Nos. 4,405,572, 5,276,235, and 5,171,868, for example.

A problem which has existed in such prior practices has been the formation of relatively large quantities of an aqueous process stream containing molybdenum, sodium and organics, and the disposal of such aqueous process streams. The presence of molybdenum is particularly troublesome since this material must be removed prior to outfall to satisfy environmental restrictions.

The present invention is closely related to commonly assigned U.S. Pat. No. 5,585,077, the disclosure of which is incorporated herein by reference.

In U.S. Pat. No. 5,585,077 the aqueous process stream containing molybdenum and sodium values as well as organics is incinerated. During the incineration process, particulate ash comprised of the molybdenum and sodium values, passes downwardly through the incinerator with the incinerator gases. The ash-containing gases are quenched by admixture with water to form the incinerator blowdown. The blowdown is an aqueous solution of the sodium values, usually as carbonates and molybdenum values, usually as sodium molybdate, from the epoxidation process stream. The blowdown solution may not be directly discharged due to environmental hazards associated with the molybdenum heavy metal contained therein. In accordance with the procedure of U.S. Pat. No. 5,585,077 the aqueous blowdown stream is acidified, as with HCl, to a pH of below 5 so that the carbonates are converted to $CO_2$ which can readily be removed. Thereafter, the pH of the carbonate-free stream is adjusted upwardly by caustic addition and calcium values are added to convert the molybdenum values contained therein to $CaMoO_4$ which is precipitated from solution and recovered. The resulting aqueous solution greatly reduced in contained molybdenum can then be conveniently disposed of with minimum further treatment.

Although the said process of U.S. Pat. No. 5,585,077 is highly successful for the recovery of molybdenum values, the recovery of precipitated $CaMoO_4$ by filtration is relatively slow due to the very small size of the precipitated $CaMoO_4$ values. Frequently a filter aid is employed to facilitate the filtration but this is onerous and renders the recovered solids less useful, for example in the steel industry.

BRIEF DESCRIPTION OF THE INVENTION

In accordance with the present invention, the molybdenum and sodium containing blowdown stream obtained as described in U.S. Pat. No. 5,585,077 is acidified as by the addition of HCl but only to a pH of about 5.1–6.5 to convert the carbonate values to the sodium salt of the added acid and $CO_2$, the latter being vaporized and separated. Base is not thereafter added to adjust pH upwardly as disclosed in U.S. Pat. No. 5,585,077. Calcium values are added and the resulting formed $CaMoO_4$ solids are readily separated as by filtration.

DESCRIPTION OF THE DRAWING

The attached drawing illustrates in schematic form a practice of the invention.

DETAILED DESCRIPTION

In accordance with the present invention, as described in U.S. Pat. No. 5,585,077 an aqueous epoxidation stream containing molybdenum catalyst values, sodium values from caustic treatment and organic materials is incinerated in accordance with known procedures. Essentially complete combustion of organics is achieved. The sodium values, primarily as carbonates, and molybdenum values are recovered as an aqueous incinerator blowdown stream.

The molybdenum and sodium containing blowdown stream is then acidified to a pH in the range of about 5.1–6.5 and with appropriate agitation the great majority of the carbonate values are converted to the sodium salt of the added acid and $CO_2$ which is vaporized and separated. Temperatures of 25° to 120° C. can be employed to accomplish $CO_2$ removal. The higher temperatures are preferred so as to minimize the residual dissolved $CO_2$. Sparging or boiling procedures can be employed if desired or suitable. This carbonate conversion and $CO_2$ removal by means of acidification and stripping is important to the subsequent treatment of the formed $CaMoO_4$ slurry because $CaCO_3$ will form by reaction with residual carbonate resulting in increased consumption of the calcium values. Also, the $CaCO_3$ solids add to the volume of the filter cake which will increase disposal costs. Alternatively, they dilute the Mo content of the cake thus reducing its recovery value.

The acidified blowdown solution after $CO_2$ removal is then treated to convert contained molybdenum values to insoluble $CaMoO_4$ which can be recovered by filtration. Calcium values are added generally in the form of the salt of the acid used in the acidification, e.g. $CaCl_2$ where HCl is used for acidification, although CaOH or CaO can also be used. The use of the latter, however, may be detrimental to subsequent filtration.

The amount of calcium added must be at least 1/1, Ca/Mo in order to achieve satisfactory conversion of the molybdenum values to $CaMoO_4$. The greater the ratio of Ca/Mo, the greater is the conversion to $CaMoO_4$ and consequently the greater is the percentage removal of molybdenum. Preferably Ca/Mo ratios of 2/1 to 10/1 are employed, preferably 3/1 to 10/1. Higher Ca/Mo ratios are needed if competing contaminates such as carbonates or sulfates are present.

Temperature is likewise an important consideration. In order for ready conversion of molybdenum values to $CaMoO_4$ to proceed at reasonable Ca/Mo ratios, temperatures of about 80° C. up to the boiling point of the solution are employed. At temperatures of 80° C. or higher, solid $CaMoO_4$ is formed in a matter of minutes, 15 minutes to several hours generally being satisfactory.

In accordance with the invention the formed $CaMoO_4$ is an insoluble particulate which readily settles out of solution. Solids can be separated by decantation or filtration or a combination of these procedures. Proper selection of conditions results in greater than 95% removal of molybdenum from the aqueous solution, and greater than 97% removal has been attained under some conditions.

In the procedure of U.S. Pat. No. 5,585,077 where the aqueous blowdown was acidified to a pH of 5 or lower and, after $CO_2$ removal, the pH was raised to 6–9 by caustic addition, the $CaMoO_4$ crystals which are formed are extremely small in size, eg. 10–15 microns mean size which makes filtration quite slow, sometimes necessitating the use of a filter aid such as diatomaceous earth.

By contrast, in accordance with this invention the aqueous blowdown is acidified only to a pH of about 5.1–6.5 and, after $CO_2$ removal, no caustic is added. Upon addition of calcium values, $CaMoO_4$ readily crystallizes but in a substantially larger mean particle size, eg. 25–30 microns and such particles are much more easily separated as by filtration.

Apparently, the addition of caustic as described in U.S. Pat. No. 5,585,077 changes the species balance in solution such that the mechanics of nucleation and growth of $CaMoO_4$ crystals are adversely affected.

For a further description of the invention, reference is made to the accompanying drawing. Aqueous incinerator blowdown is introduced into zone 1 via line 2 together with sufficient HCl introduced via line 3 to lower the pH of the resulting solution to the range of about 5.1–6.5. The temperature of the solution in zone 1 can be maintained above 80° C. and the carbon dioxide formed as a result of acidification of the carbonate values in the incinerator blowdown is removed via line 4. A stripping gas such as nitrogen (not shown) can be introduced into zone 1 to aid in $CO_2$ removal.

The substantially carbonate-free solution can be passed via line 5 from zone 1 to filter 6 wherein a small amount of solids formed in zone 1 are filtered from the solution and removed via line 7. These solids are comprised of compounds of Mo, Fe and Na. These solids do not appear to interfere with subsequent $CaMoO_4$ formation or filtration so their removal is discretionary.

From filter 6 the solution passes via line 8 to zone 9. An aqueous $CaCl_2$ stream is added to the feed to zone 9 via line 11 in amount sufficient to provide at least a 1/1 stoichiometric ratio of Ca/Mo and preferably at least a 2/1 stoichiometric ratio of Ca/Mo in zone 9.

In zone 9 solution temperature is maintained in the range of about 80° C. to the boiling point with a residence time of 15 minutes or more whereby $CaMoO_4$ is formed as a solid insoluble precipitate. Appropriate mixing is provided in zone 9 by conventional means.

The processes represented by zones 1, 6 and 9 can be carried out in batch or continuous modes, the batch mode being preferred, and accomplished in a single vessel.

The solids-containing solution passes from zone 9 via line 12 to filter 13 where the solid precipitate forms a cake and is separated via line 14 to $CaMoO_4$ recovery. The filtrate solution which has a greatly reduced molybdenum values content is recovered via line 15.

EXAMPLE

Referring to the attached drawing, a molybdenum containing stream from a propylene oxide and styrene monomer process is incinerated in accordance with conventional procedures and a blowdown stream comprised of molybdenum and sodium carbonates is recovered. The blowdown stream containing by weight 7% sodium carbonate, 5% sodium bicarbonate, 1100 pm Mo, 200 ppm S, and 10 ppm Fe is fed at the rate of 18000 lbs per hour to zone 1 via line 2. Also fed to zone 1 via line 3 is an aqueous hydrochloric acid stream comprised of 30–32% HCl by weight at the rate of 4400 lbs per hour to adjust the pH of the resulting mixture to about 5.1–6.5. In zone 1 the solution is maintained at 90° C. and formed $CO_2$ is removed via line 4 at the rate of 1100 lbs per hour.

The substantially carbonate-free solution is passed from zone 1 via line 5 to filter 6 wherein 25 ppm of dry solids is separated via line 7.

The filtrate from filter 6 passes via line 8 to zone 9 in admixture with 1500 lbs per hour of aqueous $CaCl_2$ (30 wt % $CaCl_2$) introduced via line 11. The mixture in zone 9 is thoroughly mixed and is maintained at 90° C. with a residence time of 30 minutes. In zone 9 a reaction occurs between the molybdenum values in the feed solution and the introduced calcium compound whereby calcium molybdate is formed and precipitated. The mixture from zone 9 passes via line 12 to filter 13 wherein the calcium molybdate is filtered from the solution and the cake is removed via line 14 at the rate of 100 lbs per hour, the cake containing about 30% moisture. The filtrate is recovered via line 15 at the rate of 22500 lbs per hour and contains 25 ppm of molybdenum. The stream is suitable for discharge without substantial further treatment.

Filtration rates in excess of 12 $GPM/ft^2$ have been demonstrated with this invention in contrast to typical filtration rates of about 2.5 $GPM/ft^2$, with filteraid, achieved with the procedure described in U.S. Pat. No. 5,585,077.

We claim:

1. The process for separation of molybdenum epoxidation catalyst values from a molybdenum and sodium containing epoxidation process stream which comprises incinerating the said stream, separating an aqueous stream from the incineration containing the molybdenum and sodium, acidifying the separated aqueous stream to a pH of about 5.1–6.5 and separating formed $CO_2$, reacting the remaining solution with a calcium compound at 80° C. to the boiling point, the ratio of added Ca to Mo in the solution being at least 1/1, and separating formed $CaMoO_4$ solid.

2. The process of claim 1 wherein said separated aqueous stream is acidified with HCl.

3. The process of claim 1 wherein the ratio of added Ca to Mo is 2/1 to 50/1.

* * * * *